(12) United States Patent
Ishizaka

(10) Patent No.: US 8,098,960 B2
(45) Date of Patent: Jan. 17, 2012

(54) IMAGE PROCESSING APPARATUS, COMPUTER READABLE MEDIUM STORING PROGRAM, IMAGE PROCESSING METHOD, AND COMPUTER DATA SIGNAL

(75) Inventor: Kanya Ishizaka, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1086 days.

(21) Appl. No.: 11/790,040

(22) Filed: Apr. 23, 2007

(65) Prior Publication Data

US 2008/0025625 A1    Jan. 31, 2008

(30) Foreign Application Priority Data

Jul. 28, 2006   (JP) .................................. 2006-205798
Dec. 11, 2006   (JP) .................................. 2006-333234

(51) Int. Cl.
    *G06K 9/32*    (2006.01)
(52) U.S. Cl. ........ 382/299; 345/427; 345/582; 345/628; 345/645; 345/647; 348/143; 348/335; 348/36; 353/121; 359/690; 359/725; 382/254; 382/284; 382/285
(58) Field of Classification Search .................. None
    See application file for complete search history.

(56) References Cited

U.S. PATENT DOCUMENTS

| 5,029,017 | A | * | 7/1991 | Abe et al. ...................... 358/451 |
| 5,335,296 | A | * | 8/1994 | Larkin et al. .................. 382/298 |
| 5,394,250 | A | * | 2/1995 | Shono .......................... 358/3.03 |
| 5,396,583 | A | * | 3/1995 | Chen et al. .................... 345/427 |
| 5,418,626 | A | * | 5/1995 | Semasa ......................... 358/451 |
| 5,655,061 | A | * | 8/1997 | Tse et al. ...................... 358/1.2 |
| 5,742,708 | A | * | 4/1998 | Yeh et al. ...................... 382/299 |
| 5,901,274 | A | * | 5/1999 | Oh ................................ 358/1.2 |
| 6,005,611 | A | * | 12/1999 | Gullichsen et al. ......... 348/211.6 |
| 6,028,584 | A | * | 2/2000 | Chiang et al. ................ 345/628 |
| 6,097,854 | A | * | 8/2000 | Szeliski et al. ............... 382/284 |
| 6,141,017 | A | * | 10/2000 | Cubillo et al. ............... 345/660 |

(Continued)

FOREIGN PATENT DOCUMENTS

JP    A 58-97958    6/1983

(Continued)

OTHER PUBLICATIONS

May 23, 2011 Notification of Reasons for Refusal issued in Japanese Patent Application No. 2006-333234 with translation.

*Primary Examiner* — Anand Bhatnagar
*Assistant Examiner* — Tsung-Yin Tsai
(74) *Attorney, Agent, or Firm* — Oliff & Berridge, PLC

(57) ABSTRACT

An image processing apparatus includes: a table generation unit that generates a table in which a coefficient set including predetermined weighting coefficients and pixels contained in a resolution converted image are related to each other on the basis of a size of an input image and a size of a resolution converted image; a coefficient selecting unit that selects a coefficient set to be applied for a calculation of a pixel value in the resolution converted image out of plural coefficient sets on the basis of a table generated by the table generation unit; and a pixel value calculating unit that calculates pixel values to be used in the resolution converted image resulting from the resolution conversion of the input image on the basis of the coefficient set selected by the coefficient selecting unit and plural pixel values contained in the input image.

10 Claims, 11 Drawing Sheets

INPUT IMAGE

REDUCED IMAGE

U.S. PATENT DOCUMENTS

| | | | |
|---|---|---|---|
| 6,369,818 B1* | 4/2002 | Hoffman et al. | 345/427 |
| 6,559,853 B1* | 5/2003 | Hashimoto et al. | 345/582 |
| 6,778,207 B1* | 8/2004 | Lee et al. | 348/36 |
| 6,793,350 B1* | 9/2004 | Raskar et al. | 353/121 |
| 6,833,843 B2* | 12/2004 | Mojaver et al. | 345/647 |
| 7,006,707 B2* | 2/2006 | Peterson | 382/285 |
| 7,126,616 B2* | 10/2006 | Jasa et al. | 345/645 |
| 2002/0196470 A1 | 12/2002 | Kawamoto et al. | |
| 2003/0095338 A1* | 5/2003 | Singh et al. | 359/725 |
| 2003/0095723 A1* | 5/2003 | Ishizaka et al. | 382/298 |
| 2003/0179953 A1* | 9/2003 | Ishizaka | 382/298 |
| 2003/0189579 A1* | 10/2003 | Pope | 345/660 |
| 2004/0001146 A1* | 1/2004 | Liu et al. | 348/207.99 |
| 2004/0126033 A1* | 7/2004 | Ishizaka | 382/254 |
| 2005/0007453 A1* | 1/2005 | Ahiska | 348/143 |
| 2005/0007477 A1* | 1/2005 | Ahiska | 348/335 |
| 2005/0105768 A1* | 5/2005 | Yang et al. | 382/103 |
| 2005/0243103 A1* | 11/2005 | Rudolph | 345/647 |
| 2006/0050074 A1* | 3/2006 | Bassi | 345/427 |
| 2006/0056056 A1* | 3/2006 | Ahiska et al. | 359/690 |
| 2007/0159524 A1* | 7/2007 | Kim et al. | 348/36 |
| 2007/0211955 A1* | 9/2007 | Pan et al. | 382/254 |
| 2008/0085063 A1* | 4/2008 | Saito | 382/299 |

FOREIGN PATENT DOCUMENTS

| | | |
|---|---|---|
| JP | A 6-223173 | 8/1994 |
| JP | A 9-91412 | 4/1997 |
| JP | A 9-218945 | 8/1997 |
| JP | A-11-283024 | 10/1999 |
| JP | A 11-328386 | 11/1999 |
| JP | A-2003-069830 | 3/2003 |

* cited by examiner

FIG. 1A
RELATED ART
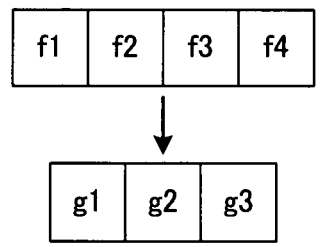
FIG. 1B
RELATED ART
$$\begin{cases} g1 = f1 \\ g2 = f2 \\ g3 = f3 \end{cases}$$
FIG. 1C
RELATED ART
$$\begin{cases} g1 = f1 * 9/12 + f2 * 3/12 \\ g2 = f2 * 6/12 + f3 * 6/12 \\ g3 = f3 * 3/12 + f4 * 9/12 \end{cases}$$
FIG. 1D
RELATED ART
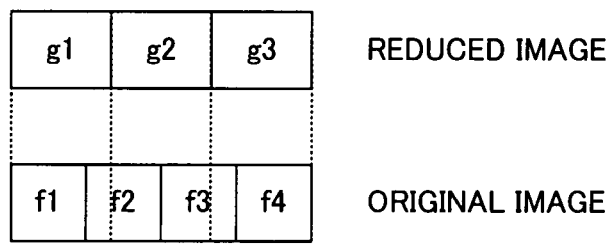
FIG. 1E
$$g_i = \sum_{j=1}^{m} p_{ij} f_j \quad (i=1,\ldots,n) \quad \text{where} \quad \sum_{j=1}^{n} p_{ij} = 1 \quad \text{for} \quad i=1,\ldots,n$$

BASIC REDUCTION 0 (1→1)

BASIC REDUCTION 1 (2→1)

BASIC REDUCTION 2 (3→2)

BASIC REDUCTION 3 (4→3)

BASIC REDUCTION 4 (5→4)

IMAGE PROCESSING APPARATUS 2

IMAGE PROCESSING PROGRAM 5

FIG. 6A $$\begin{cases} 1 \to 1 \\ 2 \to 1 \end{cases}$$

BASIC REDUCTIONS

FIG. 6B

|   | 0 | 1 |   |
|---|---|---|---|
| 0 | 1 | $\frac{1}{2}$ | $\frac{1}{2}$ |
| 1 | $\frac{1}{2}$ | $\frac{1}{4}$ | $\frac{1}{4}$ |
|   | $\frac{1}{2}$ | $\frac{1}{4}$ | $\frac{1}{4}$ |

FRAGMENTAL REDUCTIONS AND
TABLE NUMBERS

FIG. 6C $$\begin{cases} \text{BASIC REDUCTION } (1 \to 1)\text{: TABLE NUMBER 0} \\ \text{BASIC REDUCTION } (2 \to 1)\text{: TABLE NUMBER 1} \end{cases}$$

RELATIONSHIP BETWEEN TABLE
NUMBERS AND BASIC REDUCTIONS

FIG. 7A $$\begin{cases} 1 \to 1 \\ 2 \to 1 \\ 3 \to 2 \\ 4 \to 3 \\ 5 \to 4 \end{cases}$$

BASIC REDUCTIONS

FIG. 7B

| | 0 | 1 | 2 | 3 | 4 |
|---|---|---|---|---|---|
| 0 | $1$ | $\frac{1}{2}$ \| $\frac{1}{2}$ | $\frac{3}{4}$ \| $\frac{1}{4}$ | $\frac{1}{4}$ \| $\frac{3}{4}$ | $\frac{1}{2}$ \| $\frac{1}{2}$ |
| 1 | $\frac{1}{2}$ / $\frac{1}{2}$ | $\frac{1}{4}$ \| $\frac{1}{4}$ / $\frac{1}{4}$ \| $\frac{1}{4}$ | $\frac{3}{8}$ \| $\frac{1}{8}$ / $\frac{3}{8}$ \| $\frac{1}{8}$ | $\frac{1}{8}$ \| $\frac{3}{8}$ / $\frac{1}{8}$ \| $\frac{3}{8}$ | $\frac{1}{4}$ \| $\frac{1}{4}$ / $\frac{1}{4}$ \| $\frac{1}{4}$ |
| 2 | $\frac{3}{4}$ / $\frac{1}{4}$ | $\frac{3}{8}$ \| $\frac{3}{8}$ / $\frac{1}{8}$ \| $\frac{1}{8}$ | $\frac{3}{8}$ \| $\frac{2}{8}$ / $\frac{2}{8}$ \| $\frac{1}{8}$ | $\frac{2}{8}$ \| $\frac{3}{8}$ / $\frac{1}{8}$ \| $\frac{2}{8}$ | $\frac{3}{8}$ \| $\frac{3}{8}$ / $\frac{1}{8}$ \| $\frac{1}{8}$ |
| 3 | $\frac{1}{4}$ / $\frac{3}{4}$ | $\frac{1}{8}$ \| $\frac{1}{8}$ / $\frac{3}{8}$ \| $\frac{3}{8}$ | $\frac{2}{8}$ \| $\frac{1}{8}$ / $\frac{3}{8}$ \| $\frac{2}{8}$ | $\frac{1}{8}$ \| $\frac{2}{8}$ / $\frac{2}{8}$ \| $\frac{3}{8}$ | $\frac{1}{8}$ \| $\frac{1}{8}$ / $\frac{3}{8}$ \| $\frac{3}{8}$ |
| 4 | $\frac{1}{2}$ / $\frac{1}{2}$ | $\frac{1}{4}$ \| $\frac{1}{4}$ / $\frac{1}{4}$ \| $\frac{1}{4}$ | $\frac{3}{8}$ \| $\frac{1}{8}$ / $\frac{3}{8}$ \| $\frac{1}{8}$ | $\frac{1}{8}$ \| $\frac{3}{8}$ / $\frac{1}{8}$ \| $\frac{3}{8}$ | $\frac{1}{8}$ \| $\frac{1}{8}$ / $\frac{1}{8}$ \| $\frac{1}{8}$ |

FRAGMENTAL REDUCTIONS AND TABLE NUMBERS

FIG. 7C $$\begin{cases} \text{BASIC REDUCTION } (1 \to 1): \text{ TABLE NUMBER 0} \\ \text{BASIC REDUCTION } (2 \to 1): \text{ TABLE NUMBER 1} \\ \text{BASIC REDUCTION } (3 \to 2): \text{ TABLE NUMBER 23} \\ \text{BASIC REDUCTION } (4 \to 3): \text{ TABLE NUMBER 243} \\ \text{BASIC REDUCTION } (5 \to 4): \text{ TABLE NUMBER 2443} \end{cases}$$

RELATIONSHIP BETWEEN TABLE
NUMBERS AND BASIC REDUCTIONS

FIG. 8A $$\begin{cases} 1 \to 1 \\ 2 \to 1 \\ 3 \to 2 \end{cases}$$

BASIC REDUCTIONS

FIG. 8B

| | 0 | 1 | 2 |
|---|---|---|---|
| 0 | 1 | $\frac{1}{2}$ \| $\frac{1}{2}$ | $\frac{3}{4}$ \| $\frac{1}{4}$ |
| 1 | $\frac{1}{2}$ / $\frac{1}{2}$ | $\frac{1}{4}$ \| $\frac{1}{4}$ / $\frac{1}{4}$ \| $\frac{1}{4}$ | $\frac{3}{8}$ \| $\frac{1}{8}$ / $\frac{3}{8}$ \| $\frac{1}{8}$ |
| 2 | $\frac{3}{4}$ / $\frac{1}{4}$ | $\frac{3}{8}$ \| $\frac{3}{8}$ / $\frac{1}{8}$ \| $\frac{1}{8}$ | $\frac{3}{8}$ \| $\frac{2}{8}$ / $\frac{2}{8}$ \| $\frac{1}{8}$ |

FRAGMENTAL REDUCTIONS AND TABLE NUMBERS

FIG. 8C $$\begin{cases} \text{BASIC REDUCTION } (1 \to 1)\text{: TABLE NUMBER 0} \\ \text{BASIC REDUCTION } (2 \to 1)\text{: TABLE NUMBER 1} \\ \text{BASIC REDUCTION } (3 \to 2)\text{: TABLE NUMBER 21} \end{cases}$$

RELATIONSHIP BETWEEN TABLE
NUMBERS AND BASIC REDUCTIONS

FIG. 9A $$\left\{\begin{array}{l}\text{BASIC RESOLUTION CONVERSION } (4 \rightarrow 5)\text{: TABLE NUMBERS } (-1) (-2) (4)2 \\ \text{BASIC RESOLUTION CONVERSION } (3 \rightarrow 4)\text{: TABLE NUMBERS } (-1) (-2)2 \\ \text{BASIC RESOLUTION CONVERSION } (2 \rightarrow 3)\text{: TABLE NUMBER } (-1)4 \\ \text{BASIC RESOLUTION CONVERSION } (1 \rightarrow 1)\text{: TABLE NUMBER } -1 \text{ (INCREMENT = 0)} \\ \text{BASIC RESOLUTION CONVERSION } (1 \rightarrow 1)\text{: TABLE NUMBER 0 (INCREMENT = 1)} \\ \text{BASIC RESOLUTION CONVERSION } (2 \rightarrow 1)\text{: TABLE NUMBER 1} \\ \text{BASIC RESOLUTION CONVERSION } (2 \rightarrow 2)\text{: TABLE NUMBER 23} \\ \text{BASIC RESOLUTION CONVERSION } (4 \rightarrow 3)\text{: TABLE NUMBER 243} \\ \text{BASIC RESOLUTION CONVERSION } (5 \rightarrow 4)\text{: TABLE NUMBER 2443}\end{array}\right.$$

MANNERS OF BASIC RESOLUTION CONVERSION
AND THEIR TABLE NUMBERS

FIG. 9B

FRAGMENTAL RESOLUTION CONVERSION
AND TABLE NUMBERS

IMAGE PROCESSING PROGRAM 52

SHARP FILTER

IMAGE PROCESSING PROGRAM 54

LOW PASS FILTER

IMAGE PROCESSING APPARATUS, COMPUTER READABLE MEDIUM STORING PROGRAM, IMAGE PROCESSING METHOD, AND COMPUTER DATA SIGNAL

CROSS-REFERENCE TO RELATED APPLICATIONS

This application is based on and claims priority under 35 USC 119 from Japanese Patent Application No. 2006-205798 filed Jul. 28, 2006 and Japanese Patent Application No. 2006-333234 filed Dec. 11, 2006.

BACKGROUND

The present invention relates to an image processing apparatus which changes the size of images, a computer readable medium storing a program, an image processing method, and a computer data signal.

SUMMARY

According to an aspect of the invention, there is provided an image processing apparatus including: a table generation unit that generates a table in which a coefficient set including predetermined weighting coefficients and pixels contained in a resolution converted image are related to each other on the basis of a size of an input image and a size of a resolution converted image; a coefficient selecting unit that selects a coefficient set to be applied for a calculation of a pixel value in the resolution converted image out of plural coefficient sets on the basis of a table generated by the table generation unit; and a pixel value calculating unit that calculates pixel values to be used in the resolution converted image resulting from the resolution conversion of the input image on the basis of the coefficient set selected by the coefficient selecting unit and plural pixel values contained in the input image.

BRIEF DESCRIPTION OF THE DRAWINGS

Exemplary embodiments of the present invention will be described in detail based on the following figures, wherein:
FIGS. 1A to 1E illustrate processing of image reduction;
FIGS. 6A to 6C illustrate a basic reduction, fragmental reductions and table numbers in a first exemplary embodiment;
FIGS. 7A to 7C illustrate a basic reduction, fragmental reductions and table numbers in a second exemplary embodiment;
FIGS. 8A to 8C illustrate a basic reduction, fragmental reductions and table numbers in a third exemplary embodiment;
FIGS. 9A and 9B illustrate a basic resolution conversion, fragmental resolution conversion and table numbers in a fourth exemplary embodiment.

DETAILED DESCRIPTION

Figure 2A:
FIGS. 2A to 2E illustrate basic reductions.

First, to facilitate understanding of an aspect of the present invention, its background and outline will be described.

In recent years, the extensive circulation of electronic documents has called forth a general demand for high quality displaying or printing of digital images. High quality displaying or printing requires techniques for picture quality improvement, and one technique for outputting images in high picture quality to output devices differing in resolution is particularly desired. For instance, when an image of 75 dpi display resolution is to be outputted to a printer of 600 dpi, the image should be enlarged eightfold. When an image scanned at 600 dpi is to be saved or printed at 400 dpi, the image should be reduced by the ratio of 2/3.

The need to enlarge (in or out) images in high picture quality is a common challenge to digital images. Commonly used digital images can be classified into several types differing in characteristics, and therefore enlargement in high picture quality requires a processing method matched with the characteristics of each type.

Next, the focus is on methods of image reduction or magnification at low ratios which the first through sixth exemplary embodiments of the invention (hereinafter collectively referred to as the present exemplary embodiments) to be described in further detail afterwards. Although the following description will refer only to the fast-scanning direction (one-dimensional direction) for the sake of convenience, it will equally hold true of the slow-scanning direction and the two-dimensional direction. While the following will concentrate on the reduction of images on which the first through third exemplary embodiments focus, it will be equally applicable to general resolution conversion (resize) including reduction and magnification at low ratios which is the theme of the fourth exemplary embodiment.

By the simple skipping method, where four pixels (whose pixel values are f1 to f4) are to be reduced to three (whose pixel values are g1 to g3) as shown in FIG. 1A, the single pixel value fj (j=1 to 4 in this drawing) on the original image in the closest position to the reduced pixel value gi (i=1 to 3 in this drawing) when the reduced image is superposed over the original image is adopted as gi.

For instance, when the four pixels in the fast-scanning position shown in FIG. 1A are to be reduced to three, a calculation method shown in FIG. 1B is used. Thus, the simple skipping method requires a smaller volume of arithmetic operation to achieve a given reduction ratio, and is more effective in enhancing the speed than the projective reduction method to be described afterwards.

The projective reduction method uses the area ratio sum of the pixel value group fj on the original image which overlaps gi when the reduced pixels are projected and superposed over the original image (f1 to f4) as shown in FIG. 1D, where gi is a reduced pixel value (i=1 to 3 in this drawing). When four pixels of the fast-scanning position are to be reduced to three by the projective reduction method as in this case, a calculation method shown in FIG. 1C is used. Although the projective reduction method entails no large volume of arithmetic operation in reduction by a simple ratio such as 1/2, it tends to generally involve a substantial increase in the volume of arithmetic operation when reduction is to be accomplished at a non-simple rational valued ratio.

In view of these problems, an image processing apparatus 2 in any of the present exemplary embodiments calculates as the pixel value of the reduced image the weight sum of plural pixel values contained in the original image by use of a weighting coefficient matrix P={$p_{ij}$} whose sum is equal to 1 as shown in FIG. 1E. Since this weighting coefficient matrix P is subject to no other constraints than the requirement that the sum of the elements should be equal to 1, it can be varied according to the balance between picture quality and speed. Also as the designing of the weighting coefficient matrix P is allowed greater freedom, the reduction processing can be simplified or increased to a high degree in speed by use of a power of 2 as the denominator of the elements of the weighting coefficient matrix P or using a weighting coefficient matrix P whose value is zero.

More specifically, the image processing apparatus 2 makes plural basic reductions available in advance and realizes reduction processing at any desired ratio by combining these basic reductions as shown in FIGS. 2A to 2E. The basic reduction means processing to reduce a basic processing block of a predetermined size into a reduced block of a predetermined size and, as shown in FIGS. 2A to 2E, a weighting coefficient for figuring out the pixel value of the reduced block is matched with it in advance. The basic processing block is an image area set on the input image (the original image), and the reduced block is an image area constituting the output image (reduced image).

For instance, a basic reduction 0 is processing to convert a basic processing block of 1×1 size into a reduced block of 1×1 size as shown in FIG. 2A, and its weighting coefficient is 1. Incidentally, m×n size refers to an image of m pixels in the fast-scanning direction and n elements in the slow-scanning direction.

Figure 2B:

A basic reduction 1 is processing to convert a basic processing block of 2×1 size into a reduced block of 1×1 size as shown in FIG. 2B, and its weighting coefficients are 1/2 for a pixel value f1 and 1/2 for a pixel value f2.

Figure 2C:

A basic reduction 2 is processing to convert a basic processing block of 3×1 size into a reduced block of 2×1 size as shown in FIG. 2C, wherein the weighting coefficients of a pixel value g1 are 3/4 for the pixel value f1 and 1/4 for the pixel value f2, and the weighting coefficients of a pixel value g2 are 1/4 for the pixel value f2 and 3/4 for a pixel value f3. The weighting coefficients used here for one pixel value g of the output image are referred to as a coefficient set.

Figure 2D:
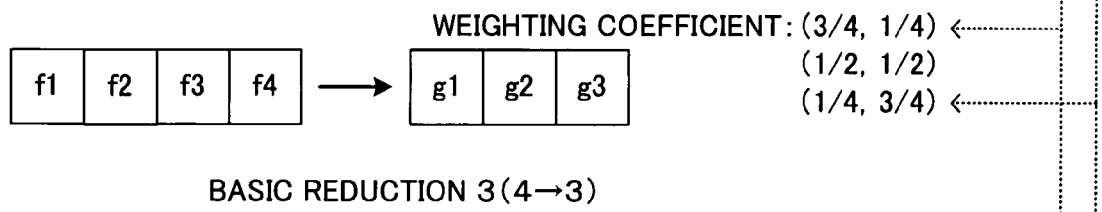

A basic reduction 3 is processing to convert a basic processing block of 4×1 size into a reduced block of 3×1 size as shown in FIG. 2D, wherein the coefficient set of the pixel value g1 is (3/4, 1/4) for the pixel values (f1, f2), the coefficient set of the pixel value g2 is (1/2, 1/2) for the pixel values (f2, f3), and the coefficient set of the pixel value g3 is (1/4, 3/4) for the pixel values (f3, f4).

Figure 2E:
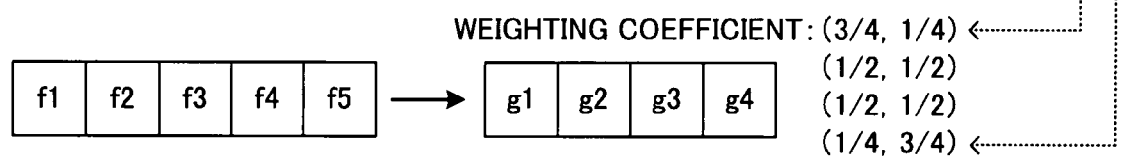

A basic reduction 4 is processing to convert a basic processing block of 5×1 size into a reduced block of 4×1 size as shown in FIG. 2E, wherein the coefficient set of the pixel value g1 is (3/4, 1/4) for the pixel values (f1, f2), the coefficient set of the pixel value g2 is (1/2, 1/2) for the pixel values (f2, f3), the coefficient set of the pixel value g3 is (1/2, 1/2) for the pixel values (f3, f4), and the coefficient set of the pixel value g4 is (1/4, 3/4) for the pixel values (f4, f5).

The denominator of every one of these weighting coefficients is a power of 2. The basic reductions 1 through 4 calculate the pixel values of the output image on the basis of plural pixel values contained in the input image.

Processing to calculate one pixel value according to each coefficient set is referred to as fragmental reduction. Each basic reduction is formed of a combination of plural fragmental reductions, each of which calculates one pixel. The plural basic reductions may share fragmental reductions as well. For instance, while the five basic reductions shown in FIGS. 2A to 2E are formed of a total of 11 fragmental reductions, the number of required fragmental reductions is reduced to four by having common fragmental reductions shared. By having the plural basic reductions share fragmental reductions in this way, it is made possible to patternize the processing, reduce the table size of weighting coefficients or reutilize the results of computation. As will be described in further detail afterwards, an index number is assigned to each fragmental reduction (coefficient set), and the numbers are tabulated for use at the time of reduction. Incidentally, where resolution conversion (resize) is to involve both reduction and magnification at low ratios as in the fourth exemplary embodiments, basic reduction and fragmental reduction will be renamed basic resolution conversion and fragmental resolution conversion, respectively, but the two are exactly the same in a functional sense.

[Hardware Configuration]

Next, the hardware configuration of the image processing apparatus 2 in the present exemplary embodiments will be described.

Figure 3:
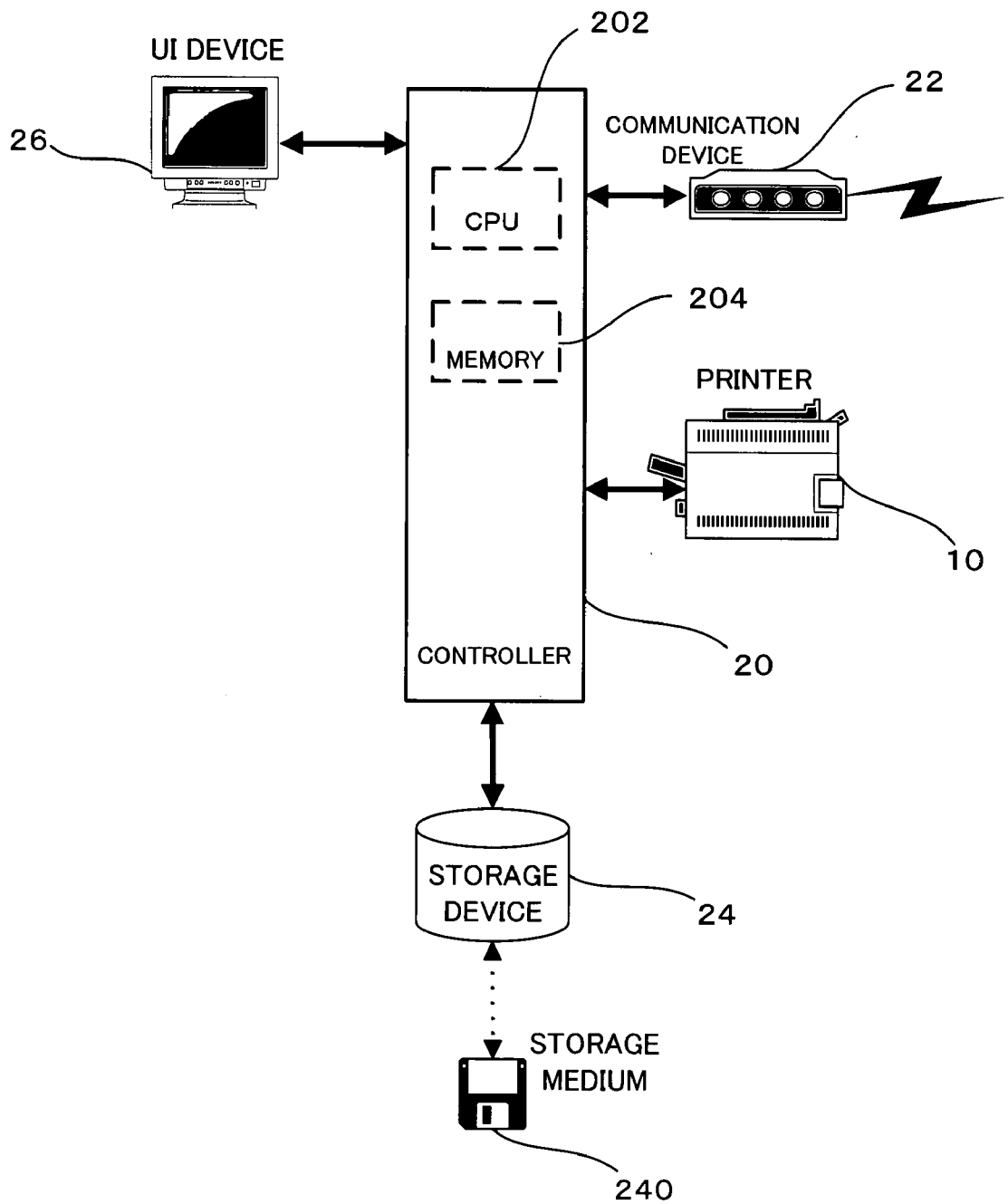
FIG. 3 shows the hardware configuration of an image processing apparatus 2 with focus on a controller 20.

FIG. 3 shows the hardware configuration of the image processing apparatus 2 with focus on a controller 20.

As shown in FIG. 3, the image processing apparatus 2 includes the controller 20 including a CPU 202 and a memory 204, a communication device 22, a storage device 24 which may be an HDD, CD device or the like and a user interface device (UI device) 26 including an LCD display or a CRT display, a keyboard, a touch panel and the like.

The image processing apparatus 2 is disposed within a printer 10 for instance, and converts the resolution of inputted image data (an input image) at a desired resolution conversion ratio (resize ratio).

[Image Processing Program]

Figure 4:
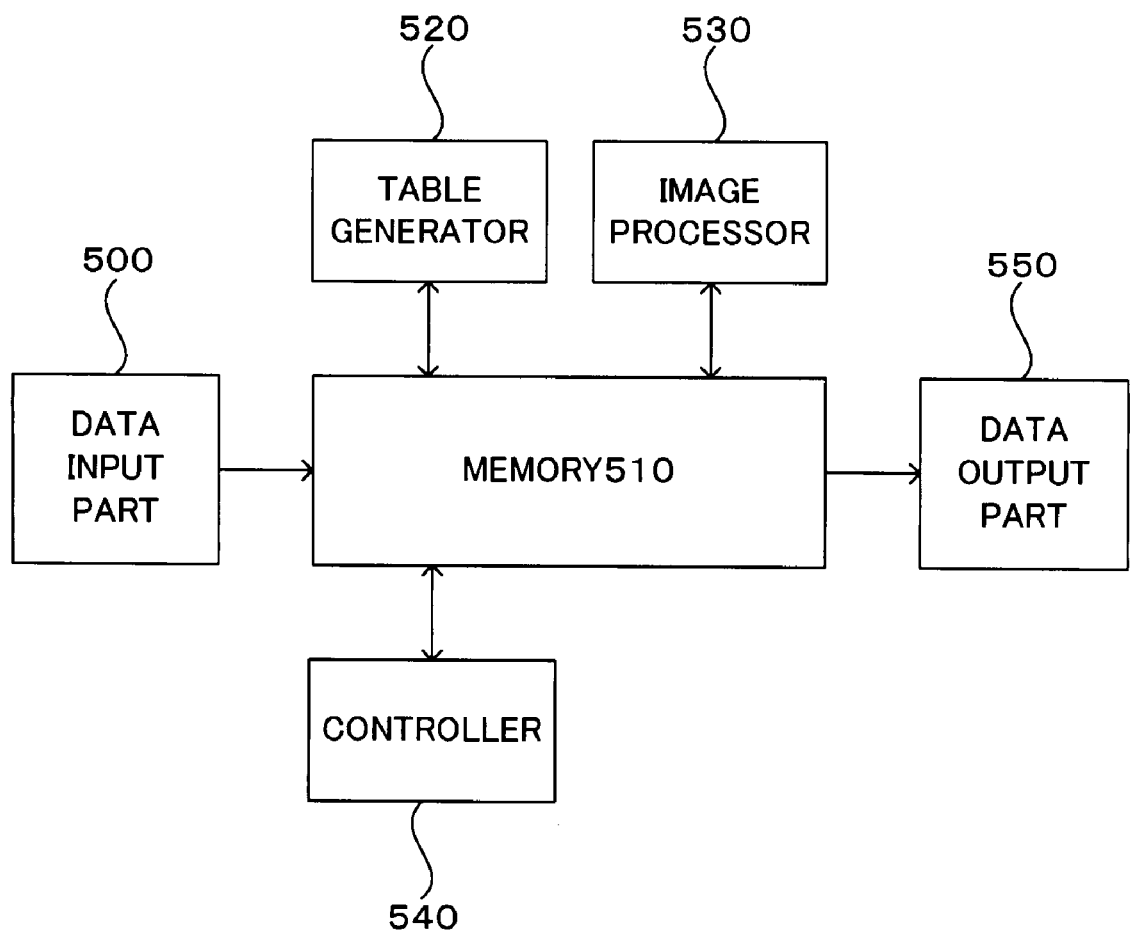
FIG. 4 shows the functional configuration of an image processing program 5 to realize an image processing method, to be executed by the controller 20.

FIG. 4 shows the functional configuration of an image processing program 5 to be executed by the controller 20 (FIG. 3).

As shown in FIG. 4, the image processing program 5 has a data input part 500, a memory 510, a table generator 520, an image processor 530, a controller 540 and a data output part 550.

The image processing program 5 is stored in a storage medium 240 for instance, and is installed in the image processing apparatus 2 through this storage medium 240.

Incidentally, the image processing program 5 may as well be realized either wholly or partly with hardware, such as ASIC.

In the image processing program 5, the data input part 500 acquires, through the communication device 22 (FIG. 3) or the storage device 24 (FIG. 3), the image data of an input image and the output size (or the resolution conversion ratio or the like) required for this input image, and outputs the acquired image data and output size to the memory 510.

The memory 510 stores the image data and the output size inputted from the data input part 500.

Further, the memory 510 provides the table generator 520, the image processor 530 and the controller 540 with a work area.

The table generator 520 generates a table in which index numbers for specifying the fragmental resolution conversion are arrayed according to the size of the inputted image data (input size) and the required output size.

Figures 5A, 5B:
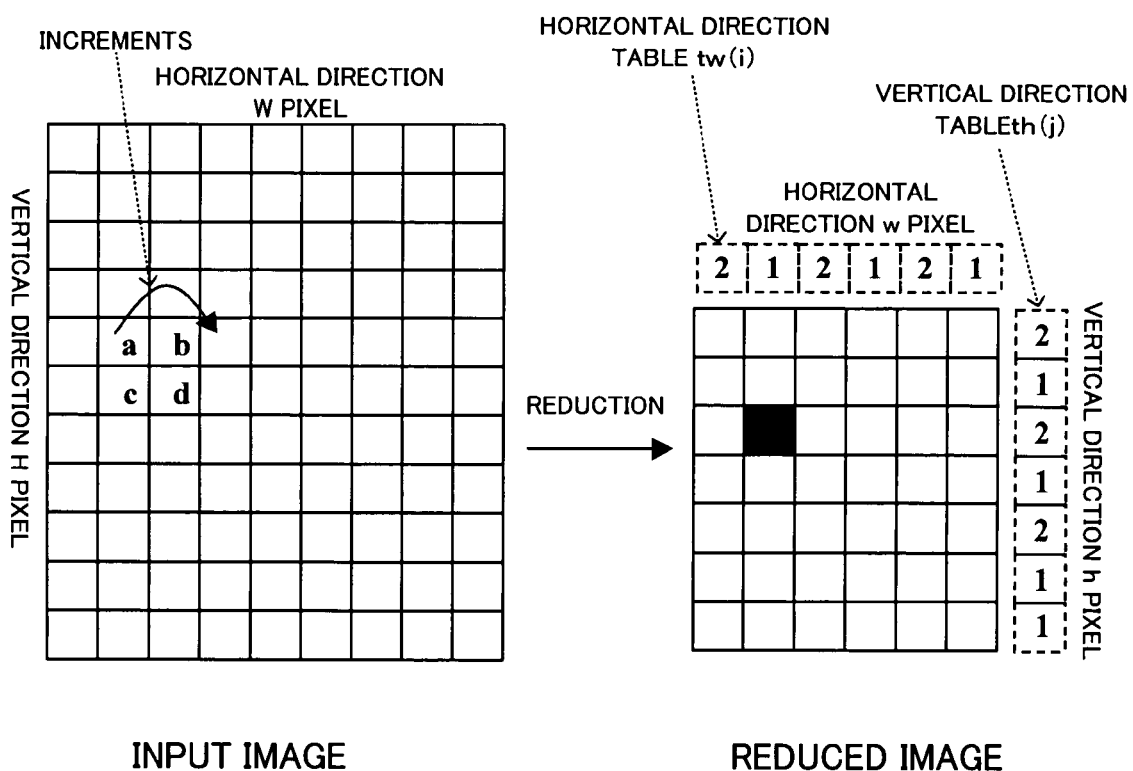
FIGS. 5A and 5B illustrate an outline of processing by an image processor 530.

In this case, since the size of the input image is W×H and the output size (resolution converted size) is w×h as shown in FIG. 5B by way of specific example, the table generator 520 generates a horizontal-direction table tw(i) and a vertical direction table th(j) according to these input size W×H and output size w×h, where i=1, ..., w and j=1, ..., h.

The image processor 530 calculates pixel values of the resolution converted image by use of the image data stored in the memory 510 and the tables generated by the table generator 520. More specifically, the image processor 530 determines the reference pixel position of the input image according to the increments (increments matched with the fragmental resolution conversion) shown in FIG. 5A, calculates a weighted sum from at least one pixel value in the determined reference pixel position and a coefficient set (fragmental resolution conversion) matching the table value (namely, the index number of fragmental resolution conversion), uses the calculated weighted sum as the pixel value of the pixel in the resolution converted image. For instance, where the pixel value of the (x, y)=(2, 3) coordinates in the resolution converted image (a reduced image in this case) is to be calculated as shown in FIG. 5B, since the table value th(2) is 1 and the table value th(3) is 2, the image processor 530 selects a coefficient set (fragmental resolution conversion) wherein the horizontal direction index number is 1 and the vertical direction index number is 2, and calculates the pixel value of the pixels (2, 3) in the resolution converted image by use of this coefficient set.

The controller 540 controls other constituent elements included in the image processing program 5.

For instance, when the required reduction ratio is less than 1/2, the controller 540 controls other constituent elements to so decompose the reduction processing into multiple stages of reduction as to make the reduction ratio at each stage not less than 1/2 and to carry out these stages superposed one over another.

The data output part 550 outputs the image data of the resolution converted image by the image processor 530 to the communication device 22 or the storage device 24.

Exemplary Embodiment 1

Next, a first exemplary embodiment will be described. In this first exemplary embodiment intended for reduction of images, its image processor 530 uses 1→1 and 2→1 shown in FIG. 6A as basic reductions. Incidentally, it is obvious that a reduction at any desired ratio can be accomplished by combining these basic reductions. Next, decomposition into fragmental reductions is carried out. In this example four different fragmental reductions shown in FIG. 6B are used, to which table numbers are given. For instance, table numbers shown in FIG. 6B can be given. The fractional value in each fragmental reduction of FIG. 6B is a weight in the generalized sense of weighted reduction in the context of the present invention. Further, it is advisable to prescribe an increment (shift value) on the input image for each fragmental reduction. This is intended to eliminate the need to calculate, when sequentially determining reduced pixels, the position of pixels on the input image related to each target reduced pixel at the time of reduction processing. The horizontal and vertical increments here are given by the total numbers of horizontal and vertical pixels, respectively, which constitute fragmental reductions in FIG. 6B. Where the fragmental reduction shown in the bottom left in FIG. 6B is used, the horizontal direction increment is 1 and the vertical direction increment is 2. In other words, to process the next pixel, the reference position on the input image can be gotten by shift one pixel in the horizontal direction. When the reduction processing of one line has ended and the next line is to be processed, the reference position can be gotten by shift two lines ahead on the original image. By giving an increment on the input image to each fragmental reduction in this way, the calculation of the reference pixel position on the input image in reduction processing may be simplified. Thus, with the use of increments presupposed, it has to be noted that, when either the horizontal direction or the vertical direction of each fragmental reduction is fixed as in the present exemplary embodiments, the increment in the other direction should be fixed in value.

Incidentally in this case, as shown in FIG. 6C, the fragmental reductions shown in FIG. 6B in themselves coincide with basic reductions. Further, as stated above, it has to be noted that the processing fragmental reduction differs with the combination of the vertical direction and the horizontal direction. For instance, when basic reductions in the horizontal direction and the vertical direction are both required to be 2→1 reduction, a fragmental reduction of 2→1 in both horizontal and vertical directions as shown in the bottom right of FIG. 6B is used. These preparations are made in advance.

Processing to reduce an image of W×H input pixels into w×h will be described below. The case here supposes w/W≧1/2 and h/H≧1/2. First, the table generator 520 generates tables tw(i) and th(j) (i=1, ..., w, j=1, ..., h) in the horizontal direction and the vertical direction, respectively. Each table can be mechanically determined as formulated below.

$$tw(i)=((i+1)*W)/w-((i)*W)/w-1 \ (i=1,\ldots,w)$$

$$th(j)=((j+1)*H)/h-((j)*H)/h-1 \ (j=1,\ldots,h)$$

Incidentally, tw(i) and th(j) here are the value of subtracting 1 each from the numbers of pixels to be referenced from the input image in the horizontal direction and the vertical direction to process target pixels in the reduced image.

When the table generator 520 has generated the tables, what remains to be done is for the image processor 530 to sequentially calculate reduced pixel values by use of the generated tables. Reduction can be processed in the horizontal direction from the top left of the image. Calculation of the pixel value of coordinates (i, j) in a reduced image of w×h size uses fragmental reductions indicated by horizontal and vertical table numbers tw(i) and th(j). For instance, where tw(i)=0 and th(j)=1, by use of the fragmental reduction at the bottom left of FIG. 6B, a/2+b/2 of two pixels a and b consecutive in the vertical direction, which are object pixels on the input image, can be calculated to obtain the reduced pixel value of the coordinates (i, j). When calculating the next coordinates (i+1, j), the aforementioned increments are referenced, and the reference position on the input image is shifted to the right of the pixel a by one pixel. Further, when one line has been processed and the processing of j+1-th line is to be processed, the reference position is shifted to two lines below the pixel a in the vertical direction on the input image and returned in the horizontal direction to the coordinate 0. In this way, the tables are referenced, fragmental reductions are executed and, while incrementing the reference position of the input image accompanying the fragmental reductions, each reduced pixel is determined. When all the reduced pixels have been determined, the data output part 550 outputs a reduced image to complete the processing.

Although the foregoing description presupposed reduction ratios of w/W≧1/2 and h/H≧1/2, where one of the ratios is w/W<1/2 or h/H<1/2, the controller 540 can control the table generator 520 and the image processor 530 to temporarily make ready w1 and h1 satisfying w1/W≧1/2 and h1/H≧1/2, respectively, reducing the input image of W×H size to w1×h1 size and further reducing the w1×h1 size to the w×h size. Incidentally, if w/w1<1/2, or h/h1<1/2 holds here, a further reduction to w2 and h2 can be processed and so forth in a stepwise manner. For instance, where W=1280, H=960, w=600 and h=400 hold, with w1=640 and h1=480 supposed, reductions can be processed in the sequence of 1280×960→640×480→600×400. The choice of w1 and h1 in this way would make usable a high speed 1/2 average value reduction for the first step of reduction.

In the first exemplary embodiment, the weights themselves of the fragmental reductions shown in FIG. 6B are the averages of reference pixels, and the fragmental reduction itself is the same as the usual projection method. However, in the overall view of the image, fragmental reductions are combined and the generalized weighted reduction is realized, giving a different result of what any usual projection method would give.

Exemplary Embodiment 2

Next, a second exemplary embodiment will be described. This second exemplary embodiment also addresses image reduction, and uses as its basic reductions 1→1, 2→1, 3→2, 4→3 and 5→4 shown in FIG. 7A. Although the number of basic reductions is greater than in the first exemplary embodiment, reduction by any required ratio may be achieved by combining these basic reductions. Next, decomposition into fragmental reductions is carried out. In this example, 25 different fragmental reductions shown in FIG. 7B are used, and table numbers are assigned to them. For instance, the table numbers shown in the same FIG. 7B can be assigned. The fractional values in the fragmental reductions in FIG. 7B are weights in the generalized concept of weighted reduction. As in the first exemplary embodiment, an increment on the input image is given to each fragmental reduction. Here again, the horizontal and vertical increments are given by the total numbers of horizontal and vertical pixels, respectively, which constitute the fragmental reductions in FIG. 7B. However, whereas pixels of 1/2 pixel size are shown in the drawing for the fragmental reductions matching table numbers 2, 3 and 4, it is meant that the 1/2 size pixel on the right or bottom side is not included in the increment in any of the fragmental reductions. For instance, in the fragmental reduction group of table numbers 2 and 4 in the horizontal direction, any increment in the horizontal direction is 1.

Incidentally, each basic reduction is prescribed by the combination of table numbers shown in FIG. 7C. It can be understood many fragmental reductions are shared.

The processing to reduce an image of input pixels W×H to w×h will be described below. Here again, the description will suppose w/W≧1/2 and h/H≧1/2. First, the table generator 520 generates tables tw(i) and th(j) (i=1, . . . , w, j=1, . . . , h) in the horizontal direction and the vertical direction, respectively. Each table is first prescribed by:

$$tw(i)=((i+1)*W)/w-((i)*W)/w-1 \ (i=1,\ldots,w)$$

$$th(j)=((j+1)*H)/h-((j)*H)/h-1 \ (j=1,\ldots,h)$$

as in the first exemplary embodiment. This gives the same table numbers consist of 0 and 1 as in the first exemplary embodiment, wherein 0 corresponds to the basic reduction 1→1, and 1 corresponds to the basic reduction 2→1. Next, the following substitutions are processed regarding the number arrays in the horizontal direction and vertical direction tables.
01→23 (corresponding to basic reduction 3→2)
001→243 (corresponding to basic reduction 4→3)
0001→2443 (corresponding to basic reduction 5→4)
This results in the allocation of table numbers from 0 to 4 in each of the horizontal and vertical tables.

Once the tables are generated, what remains to be done is for the image processor 530 to sequentially calculate reduced pixel values by use of these tables. Reduction can be processed in the horizontal direction from the top left of the image. The reduction processing that follows is exactly the same as in the first exemplary embodiment. Where the reduction ratio is w/W<1/2 or h/H<1/2, the processing can be accomplished similarly to that in the first exemplary embodiment. Thus, the differences between the first exemplary embodiment and the second exemplary embodiment lie only in the method of creating basic reductions and fragmental reductions as well as in the values of the tables and increments, but the processing itself is exactly the same.

In the present exemplary embodiments, other values than the average area ratios among the reference pixels are also used as the weight for the fragmental reductions shown in FIG. 7B. This is a contrivance to make the weight calculation faster, and actually every weight used in the present exemplary embodiments can be achieved by division by $2^n$ (a power of 2), permitting an increase in speed by bit shift operation. For instance, a fragmental reduction for which both horizontal and vertical table numbers are given by 2, which has weights of 4/9, 2/9, 2/9 and 1/9 according to the concept of the projection method, uses 3/8, 2/8, 2/8 and 1/8 as weights in the present exemplary embodiments. As stated earlier, such a generalized concept of weighted reduction satisfies the constraint shown in FIG. 1E, though the local average of the block itself is not saved before and after reduction, and therefore has no major impact in respect of density changes before and after reduction in an overall view of the image.

By looking at the first exemplary embodiment and the second exemplary embodiment, it can be understood that various ways of reduction processing can be realized. Of course, depending on the choice of the basic reduction and the fragmental reduction, reduction in the higher picture quality type can be configured or, as will be described with reference to a third exemplary embodiment, something between the first exemplary embodiment and the second exemplary embodiment can be configured. Thus, by selecting in advance the basic reduction and the fragmental reduction matching the hardware to be applied and the system environment, the balance between speed and picture quality can be flexibly adjusted. Alternatively, plural coefficient sets for the basic reduction may be made ready in advance to allow switching over from one set to another according to the mode designated by the user.

Exemplary Embodiment 3

Next, the third exemplary embodiment will be described. The third exemplary embodiment also addresses image reduction, and uses as its basic reductions 1→1, 2→1 and 3→2 shown in FIG. 8A. Again, reduction by any required ratio may be achieved by combining these basic reductions. Next, decomposition into fragmental reductions is carried out. In this case, nine different fragmental reductions shown in FIG. 8B are used, and table numbers also shown in FIG. 8B can be assigned to them for instance. The fractional values in the fragmental reductions in FIG. 8B are weights in the generalized concept of weighted reduction. As in the second exemplary embodiment, an increment on the input image is given to each fragmental reduction by the total numbers of horizontal and vertical pixels, respectively, which constitute the fragmental reductions in FIG. 8B. Further, each basic reduction is determined by a combination of table numbers shown in FIG. 8C. Here again, a number of fragmental reductions are shared.

Processing to reduce an image of W×H input pixels into w×h will be described below. The case here again supposes w/W≧1/2 and h/H≧1/2. The tables tw(i) and th(j) (i=1, ..., w, j=1, ..., h) in the horizontal direction and the vertical direction, respectively, are first determined as formulated below as in the first exemplary embodiment.

$$tw(i)=((i+1)*W)/w-((i)*W)/w-1 \ (i=1,\ldots,w)$$

$$th(j)=((j+1)*H)/h-((j)*H)/h-1 \ (j=1,\ldots,h)$$

In this way, the same table number consists of 0 and 1 as in the first exemplary embodiment are given, where 0 corresponds to the basic reduction 1→1 and 1 corresponds to the basic reduction 2→1. Next, the table generator 520 processes the following substitution regarding the number arrays in the horizontal direction and vertical direction tables.
01→21 (corresponding to basic reduction 3→2)
This results in the allocation of table numbers from 0 to 2 in each of the horizontal and vertical tables.

When the table generator 520 has generated the tables, what remains to be done is for the image processor 530 to sequentially calculate reduced pixel values by use of the generated tables as in the first and second exemplary embodiments. In this exemplary embodiment again, the differences from the first and second exemplary embodiments lie only in the method of creating basic reductions and fragmental reductions as well as in the values of the tables and increments, but the processing itself is exactly the same. In this exemplary embodiment, too, the weights of the fragmental reductions shown in FIG. 8B can be achieved by division by 2^n (a power of 2), permitting an increase in speed by bit shift operation.

Exemplary Embodiment 4

Next, a fourth exemplary embodiment will be described.

While the first through third exemplary embodiments are configured only for reduction processing, the description of this fourth exemplary embodiment, which is intended for magnification at a low ratio (not more than twofold) or different magnification/reduction ratios between the vertical and horizontal directions in addition too reduction, will concern processing to magnify or reduce an image of W×H input pixels into w×h. The description of this fourth exemplary embodiment will suppose 2≧w/W≧0 and 2≧h/H>0. Where magnification by two or more is required, high grade image magnification processing by some of the examples of the related art described above can be applied.

First, a case of resolution conversion ratios of 2≧w/W>0.5 and 2≧h/H>0.5 will be described.

In the fourth exemplary embodiment, 1→1 (increment 1), 2→1, 3→2, 4→3, 5→4, 1→1 (increment 0), 2→3, 3→4 and 4→5 shown on the left side of FIG. 9A are used as basic resolution conversion. Incidentally, on account of a difference in increment, two different ways of basic resolution conversion are available for 1→1.

The basic resolution conversion here is a concept covering both basic reduction and basic magnification, and fragmental resolution conversion is a concept covering both fragmental reduction and fragmental magnification. In this example, any required resolution conversion (resizing) can be carried out by combining these manners of basic resolution conversion. Decomposition into fragmental resolution conversion in this instance uses 49 different kinds of fragmental resolution conversion shown in FIG. 9B, and table numbers are assigned to them. For instance, the table numbers shown in the same FIG. 9B can be assigned. The fractional values in the fragmental resolution conversion in FIG. 9B are weights in the generalized concept of weighted resolution conversion (resizing). Increments on the original image are given to each way of fragmental resolution conversion. Horizontal and vertical increments are given by the total numbers of horizontal and vertical pixels, respectively, which constitute the fragmental resolution conversion in FIG. 9B. Although pixels of 1/2 pixel size are shown for fragmental resolution conversion matching the table numbers −2, −1, 2, 3 and 4, it is meant that the 1/2 size pixel on the right or bottom side is not included in the increment in any manner of fragmental resolution conversion. It is further meant that no pixel regarding the table number −1 is included in any increment. Thus, the increments of fragmental resolution conversion for the table numbers −2, −1, 0, 1, 2, 3 and 4 are respectively 1, 0, 1, 2, 2, 1 and 1. Therefore, the weights themselves for fragmental resolution conversion for the table numbers −2 and 3, the table number −1 and 0 and the table numbers 1 and 4 are shared, and differ only in increment.

Incidentally, in this example, each manner of basic resolution conversion is determined by the combination of table numbers shown on the right side of FIG. 9A.

The table generator 520 (FIG. 4), as processing to generate conversion tables, first generates tables tw(i), th(j) (i=1, ..., w, j=1, ..., h) in the horizontal direction and the vertical direction, respectively. Each table is prescribed by:

$$tw(i)=((i+1)*W)/w-((i)*W)/w-1 \ (i=1,\ldots,w)$$

$$th(j)=((j+1)*H)/h-((j)*H)/h-1 \ (j=1,\ldots,h)$$

This gives the table numbers of 0, 1 and −1 in this exemplary embodiment, wherein 0 corresponds to the basic resolution conversion 1→1 (increment 1), 1 corresponds to the basic resolution conversion 2→1, and −1 corresponds to the basic resolution conversion 1→1 (increment 0). Incidentally, this way of initial setting of table numbers prevents −1 and 1 from appearing in the tw array and the th array at the same time. Thus, if the resolution conversion is magnification, only 0 and −1 will appear or, if the resolution conversion is reduction, only 0 and 1 will appear; for instance if the resolution conversion is magnification in the vertical direction and reduction in the horizontal direction, only 0 and −1 will in th and only 0 and 1 in tw.

Next, the table generator 520 processes the following substitutions regarding the number arrays in the horizontal direction and vertical direction tables.
01→23 (corresponding to basic resolution conversion 3→2)
001→243 (corresponding to basic resolution conversion 4→3)
0001→2443 (corresponding to basic resolution conversion 5→4)
0(−1)→(−1) 4 (corresponding to basic resolution conversion 2→3)
00(−1)→(−1) (−2) 2 (corresponding to basic resolution conversion 3→4)
000(−1)→(−1) (−2) 42 (corresponding to basic resolution conversion 4→5)
This results in the allocation of table numbers from −2 to 4 in each of the horizontal and vertical tables. Incidentally, whereas manners of basic resolution conversion 2→3, 3→4 and 4→5 should be given by (−1) 40, (−1) (−2) 20 and (−1) (−2) 420, the foregoing substitutions involves no substitution of the final 0, and this is intended to expand the applicable range of resolution conversion ratio s and to simplify the processing. To take up the basic resolution conversion 2→3 as an example, since the 0(−1) 0 array is to be substituted by (−1) 40, there is no need for substituting the third 0→0. Also, the 0(−1) (−1) array can be regarded as a (−1) 4 (−1) substitution, and as such may be compatible with magnification by the ratio of 1.5 to 2.

When the tables have been generated, what remains to be done is for the image processor 530 to sequentially calculate resolution converted pixel values in exactly the same way as in the first through third exemplary embodiments. In this exemplary embodiment, when reduction is to be done, exactly the same picture quality can be provided as in the first exemplary embodiment, and moreover resolution conversion that involves magnification can also be accomplished. When reduction is the only purpose, the configuration of Exemplary Embodiment 1 may be prepared in advance, and when any other resolution conversion is also required, the configuration of this exemplary embodiment may be used.

Next, a case of 0.5>w/W or 0.5>h/H in resolution conversion ratio will be described. Conversion tables tw(i) th(j) (i=1, ..., w, j=1, ..., h) are prescribed in the same way as before as follows:

$$tw(i)=((i+1)*W)/w-((i)*W)/w-1 \ (i=1,\ldots,w)$$

$$th(j)=((j+1)*H)/h-((j)*H)/h-1 \ (j=1,\ldots,h)$$

If for instance 0.5>w/W holds here, tw will be formed only of n and n+1 values for n=(int) (W/w)−1. Here, (int) (*) is an operation to discard the decimal part of *.

When the tables have been generated, what remains to be done is to sequentially calculate the resolution converted pixel values. The resolution converted pixel value of the (i, j) coordinates of the resolution converted images can be represented by the average of all the pixels in the (tw(i)+1)×(th(j)+1) size from the pertinent position on the original image. Incidentally, the quotient (tw(i)+1)×(th(j)+1) in calculating the average generally is not a 2 n value, this is in anticipation of a sufficiently small number of pixels and accordingly a small total quantity of the final division itself with no great effect to invite a speed drop where the resolution conversion ratio is not less than 0.5. In that sense, processing involving decomposition into basic resolution conversion or fragmental resolution conversion may be performed as before if required, where the resolution conversion ratio is relatively high, from 0.25 to 0.5 for instance. Incidentally, for such processing of the ratio from 0.25 to 0.5 involving decomposition into fragmental resolution conversion, fragmental resolution conversion to reduce 3 pixels to 1 pixel and fragmental resolution conversion of 4 pixels to 1 pixel should be added as a combination of vertical and horizontal directions to the fragmental resolution conversion of 0.5 times to 1.0 times, and this means a tendency of enlarged tables. For this reason, the determination may take into consideration of the balance of the time taken to reference the tables. Also where the resolution conversion ratio greatly differs between the vertical and horizontal directions, differentiation may be made between decomposition into basic resolution conversion and the direct use of the average value according to the resolution conversion ratio. Such a configuration which permits direct processing even in the range of the ratio from 0.0 to 0.5 excels over a configuration having 1/2 n at a prior stage in respect of saving in memory occupancy and of speed increase.

Exemplary Embodiment 5

By applying a sharpness filter after the resolution conversion, the hazy impression peculiar to the projection method can be cleared, resulting in apparent picture quality.

Figure 10A:
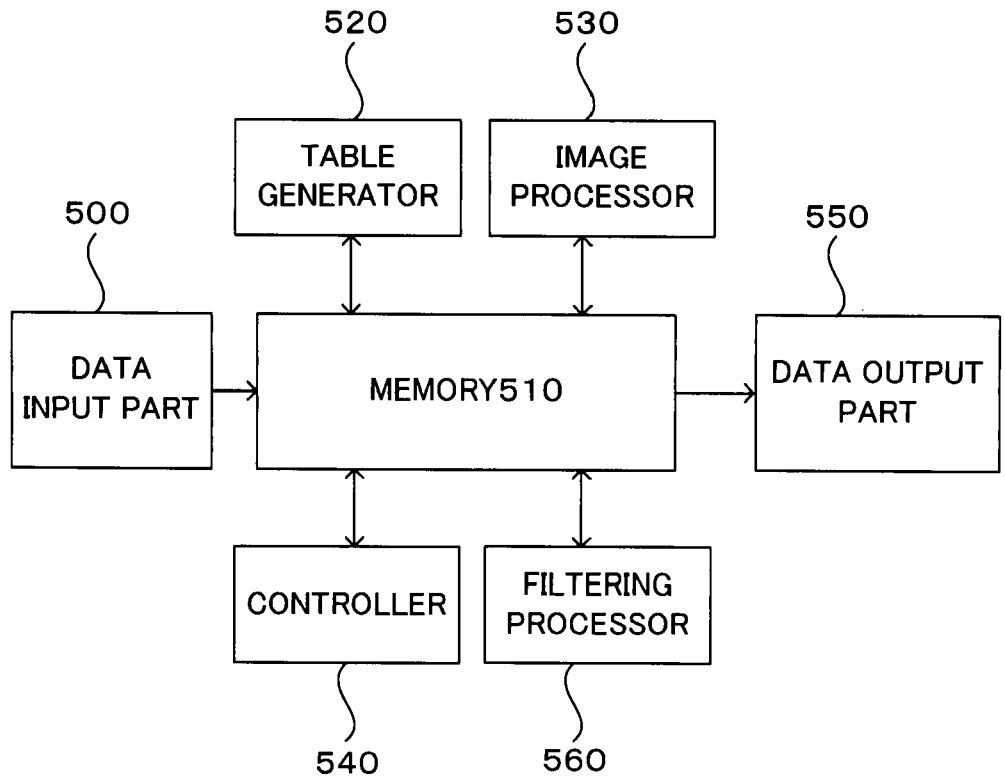
FIG. 10A shows the functional configuration of a second image processing program 52 and FIG. 10B shows a sharpness filter.

An image processing program 52 in a fifth exemplary embodiment has a configuration including the addition of a filtering processor 560 as shown in FIG. 10A.

Since this hazy impression peculiar to the projection method is more likely to occur in images containing text images and line drawings (e.g. map images), the filtering processor 560 in this example applies sharpness filter to an resolution converted image by the method of any one of the first through fourth exemplary embodiments (namely an image resolution converted by the image processor 530) only where the input image contains text images and line drawings or a text/line drawing or the like printing mode is designated by the user.

Figure 10B:
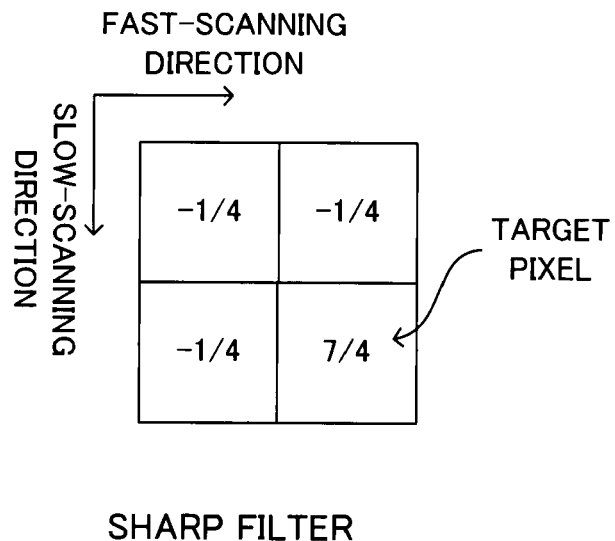

The sharpness filter may be, for instance, what is shown in FIG. 10B.

Incidentally, where the original image is a limited color image (color mapped image), such as a 16-color image, gray values may be invited by processing by any of the first through fourth exemplary embodiments, giving a hazy impression. On the other hand, though processing by the nearest neighbor method invites a high degree of deterioration in picture quality, such as the disappearance of line elements, color formation of the resolution converted image, as it is close to the original image, may give little hazy impression, a good impression in this respect. However, this exemplary embodiment sharpens a hazy gray image by sharpness filtering, resulting in a more clear impression with its color formation close to the original image. As resolution conversion is of course accomplished by the method according to the first to fifth exemplary embodiments, there is no fear of deterioration in picture quality, such as the disappearance of line elements.

Exemplary Embodiment 6

With respect to a sixth exemplary embodiment, processing of a binary input image will be described. The first through fifth exemplary embodiments address color images including 24-bit color images and 8-bit gray images.

Figure 11A:
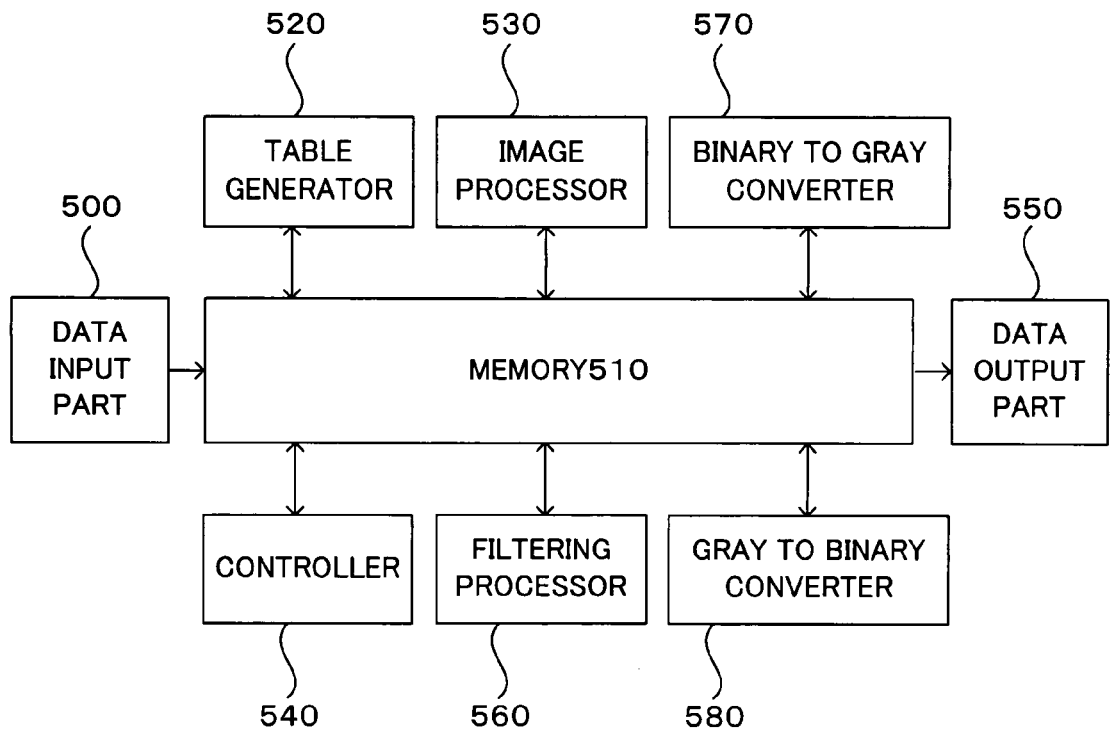
FIG. 11A shows the functional configuration of a third image processing program 54 and FIG. 11B shows a lowpass filter.

In this connection, an image processing program 54 of this exemplary embodiment has a configuration in which, as shown in FIG. 11A, a binary-to-gray value converter 570 which performs processing to convert a binary image into a gray scale image (e.g. gray scale processing to obtain an 8-bit gray image) is added before the processing by the image processor 530 (namely, processing by any of the first through fifth exemplary embodiments) and a gray-to-binary converter 580 which converts a gray scale image into a binary image (e.g. binary processing to convert an 8-bit gray image into a binary image) is added after the processing by the image processor 530. Incidentally, the gray-to-binary converter 580 is not an indispensable constituent element, but is provided as required.

The configuration of this exemplary embodiment enables the resolution conversion described with reference to the first through fifth exemplary embodiments to be applied to binary images.

As a method to convert a first through fifth exemplary embodiment into a gray scale image, the binary-to-gray converter 570 applies simple gray scale conversion for instance.

Incidentally, the filtering processor 560 may apply low pass filtering (LPF) to an image having gone through simple gray scale conversion where the inputted binary image is an error diffusion image and the resolution conversion ratio is about 0.8 to 1.2. Where it is impossible to judge whether or not any inputted image is an error diffusion image, all the inputted binary images can be subjected to low pass filtering when the resolution conversion ratio is about 0.8 to 1.2.

Figure 11B:
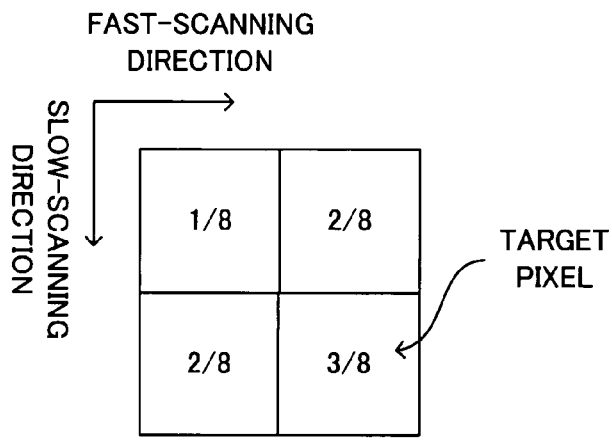

What is shown in FIG. 11B for instance can be used as the low pass filter.

The image processor 530 applies resolution conversion to a gray scale image having gone through the gray scale conversion. The resolution conversion can be applied by the method described with reference to the fourth exemplary embodiment for example.

The gray-to-binary converter 580 subjects the gray scale image having gone through resolution conversion to processing for conversion to a binary image. In the case of "binary image input→anti-alias and resolution conversion→gray scale image output", the final processing for conversion to a binary image is unnecessary. Or in the case of "binary image input→resolution conversion→binary image output", simple binary conversion or binary conversion by error diffusion is used for the final conversion to a binary image. Where the input image is a simple binary converted image (frequently for text images), simple binary conversion is advisable for the final conversion to a binary image. Or where the input image is an error diffusion image, error diffusion method is recommended for the final conversion to a binary image.

Incidentally, as an intermediate type between the two, a halftone mask (e.g. Bayer dither binary conversion) may also be used. Where the type of the input image cannot be identified, either error diffusion or this type may be used.

Further, the gray-to-binary converter 580 can accomplish binary conversion with high picture quality while preventing the disappearance of texts or lines by varying the threshold in proportion to the square measure of the reduction ratio where the processing is reduction and simple binary conversion is to be used.

The switching-over of the final binary conversion may be differentiated by the type of the input image or the resolution conversion ratio, or printing mode. For instance, where the reduction ratio is high, error diffusion method or dithering by Bayer mask may be used as the binarization method, and where the reduction ratio is low or magnification is to be processed, simple binary conversion may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus, comprising:
a table generation unit that generates a table in which a coefficient set including predetermined weighting coefficients and pixels contained in a resolution converted image are related to each other on the basis of a size of an input image and a size of a resolution converted image;
a coefficient selecting unit that selects a particular coefficient set to be applied for a calculation of a pixel value in the resolution converted image out of a plurality of coefficient sets on the basis of a table generated by the table generation unit; and
a pixel value calculating unit that calculates pixel values to be used in the resolution converted image resulting from the resolution conversion of the input image on the basis of the particular coefficient set selected by the coefficient selecting unit and a plurality of pixel values contained in the input image, wherein
the table relates pixels contained in the resolution converted image to one coefficient set included in a coefficient set group,
the coefficient set group is composed of plural coefficient sets relating to various basic resolution conversions,
the table is composed of orthogonal tables in two directions, and a size of the table corresponds to a size of the resolution converted image, and
the orthogonal tables in two directions relate pixels identified by coordinate in the resolution converted image to the particular coefficient set to be used for calculating a pixel value of the pixel.

2. The image processing apparatus according to claim 1, wherein a total sum of weighting coefficients contained in each of the coefficient sets is equal to 1, and a denominator of the weighting coefficients is a power of 2.

3. The image processing apparatus according to claim 1, wherein the plurality of coefficient sets differing from one another have at least one weighting coefficient of the same value.

4. The image processing apparatus according to claim 1, wherein a shift value for the input image is related to each of the coefficient sets; and
the pixel value calculating unit determines, on the basis of the shift value relating to a coefficient set selected by the coefficient selecting unit, a pixel position of the input image to be used for calculating pixel values of a resolution converted image.

5. The image processing apparatus according to claim 1, further having:
a range setting unit that determines a range of selectable coefficient sets,
wherein the coefficient selecting unit selects an applicable coefficient set out of multiple coefficient sets contained in the range set by the range setting unit.

6. The image processing apparatus according to claim 1, further having:
a filtering processing unit that applies filtering that depends on the input image's condition or a user's instruction to the pixel value of the resolution converted image calculated by the pixel value calculating unit.

7. The image processing apparatus according to claim 1, further having:
a gray scale converting unit that, where the input image is a binary image, convert the input image to a gray scale image,
wherein the pixel value calculating unit calculates the pixel value of the resolution converted image on the basis of the pixel value of the image converted into a gray scale image by the gray scale converting unit,
the apparatus further having:
a binary converting unit that applies binary conversion by a binarization method depending on the input image's condition to the pixel value of the resolution converted image calculated by the pixel value calculating unit.

8. The image processing apparatus according to claim 1, further having:
a binary converting unit that applies binary conversion, where an output image is a binary image, by varying a binarization threshold value in proportion to a ratio of the area between the input image and the output image.

9. A non-transitory computer readable medium storing a program for causing a computer to execute a process comprising:
    generating a table in which a coefficient set including predetermined weighting coefficients and pixels contained in a resolution converted image are related to each other on the basis of a size of an input image and a size of a resolution converted image;
    selecting a particular coefficient set to be applied for a calculation of a pixel value in the resolution converted image out of a plurality of coefficient sets on the basis of the generated table; and
    calculating pixel values to be used in the resolution converted image resulting from the resolution conversion of the input image on the basis of the selected particular coefficient set and a plurality of pixel values contained in the input image, wherein
    the table relates pixels contained in the resolution converted image to one coefficient set included in a coefficient set group,
    the coefficient set group is composed of plural coefficient sets relating to various basic resolution conversions,
    the table is composed of orthogonal tables in two directions, and a size of the table corresponds to a size of the resolution converted image, and
    the orthogonal tables in two directions relate pixels identified by coordinate in the resolution converted image to the particular coefficient set to be used for calculating a pixel value of the pixel.

10. An image processing method, comprising:
    generating a table in which a coefficient set including predetermined weighting coefficients and pixels contained in a resolution converted image are related to each other on the basis of a size of an input image and a size of a resolution converted image;
    selecting a particular coefficient set to be applied for a calculation of a pixel value in the resolution converted image out of a plurality of coefficient sets on the basis of the generated table; and
    calculating pixel values to be used in the resolution converted image resulting from the resolution conversion of the input image on the basis of the selected particular coefficient set and a plurality of pixel values contained in the input image, wherein
    the table relates pixels contained in the resolution converted image to one coefficient set included in a coefficient set group,
    the coefficient set group is composed of plural coefficient sets relating to various basic resolution conversions,
    the table is composed of orthogonal tables in two directions, and a size of the table corresponds to a size of the resolution converted image, and
    the orthogonal tables in two directions relate pixels identified by coordinate in the resolution converted image to the particular coefficient set to be used for calculating a pixel value of the pixel.

\* \* \* \* \*